G. C. KENNEDY.
VEHICLE.
APPLICATION FILED JUNE 26, 1916.
1,219,821.
Patented Mar. 20, 1917.
2 SHEETS—SHEET 1.
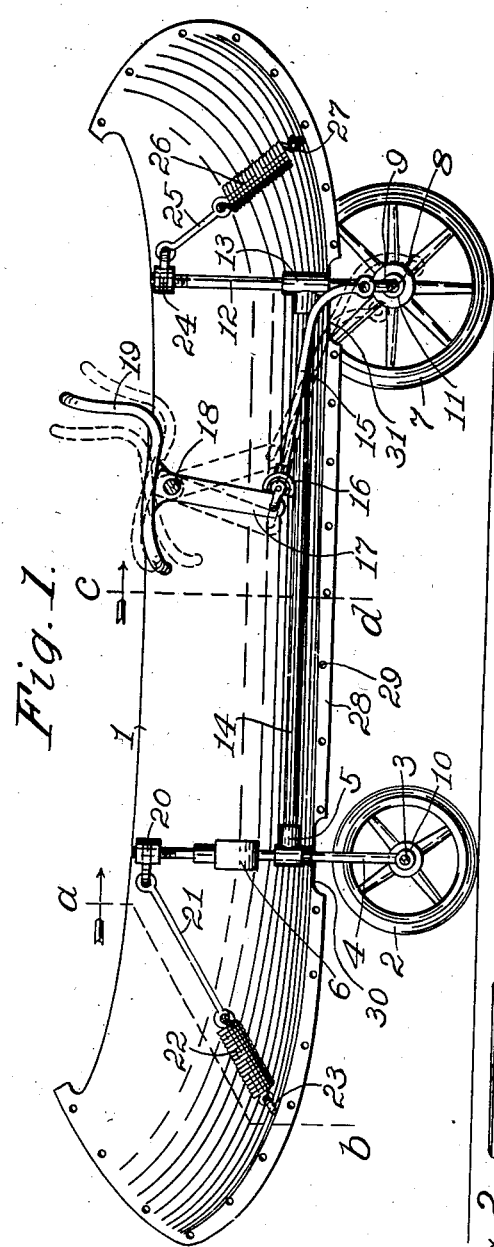
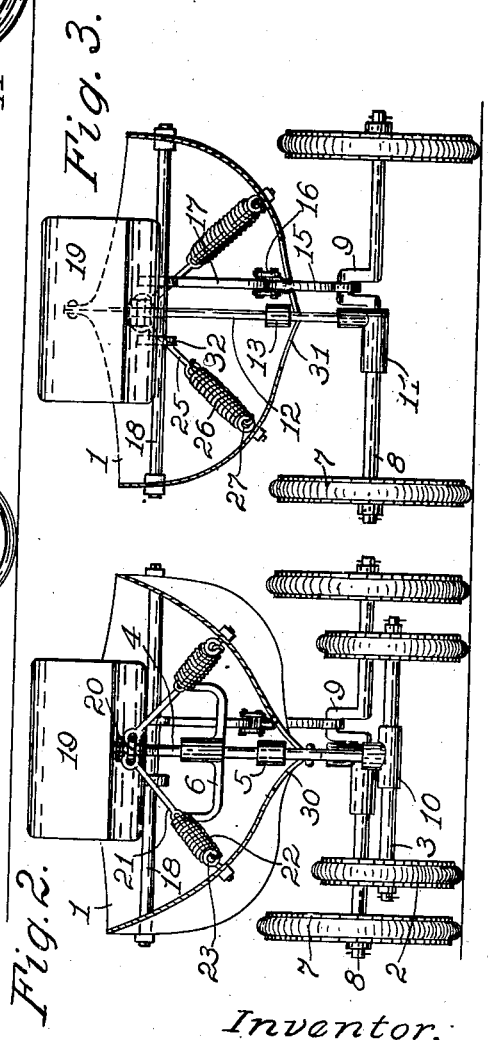
Inventor,
George Colvin Kennedy.

G. C. KENNEDY.
VEHICLE.
APPLICATION FILED JUNE 26, 1916.
1,219,821.
Patented Mar. 20, 1917.
2 SHEETS—SHEET 2.
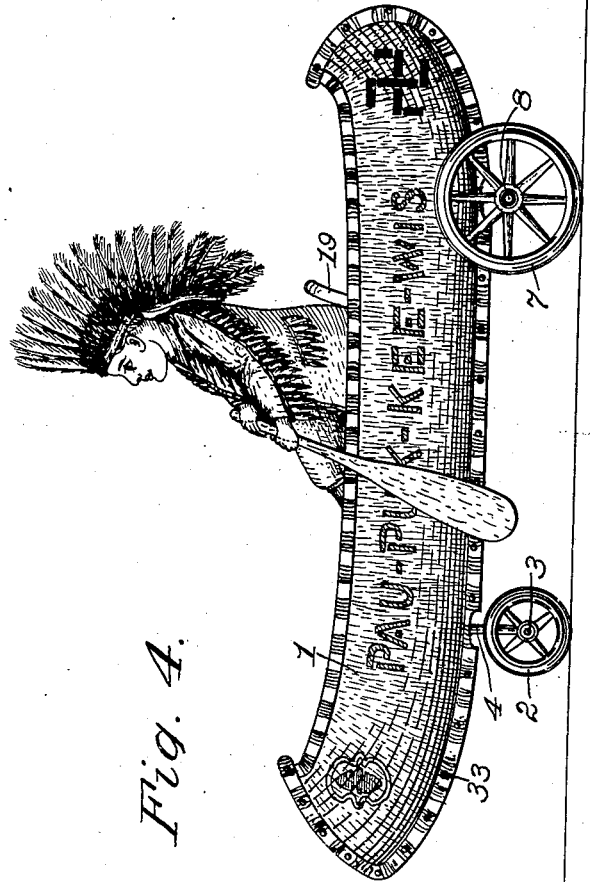
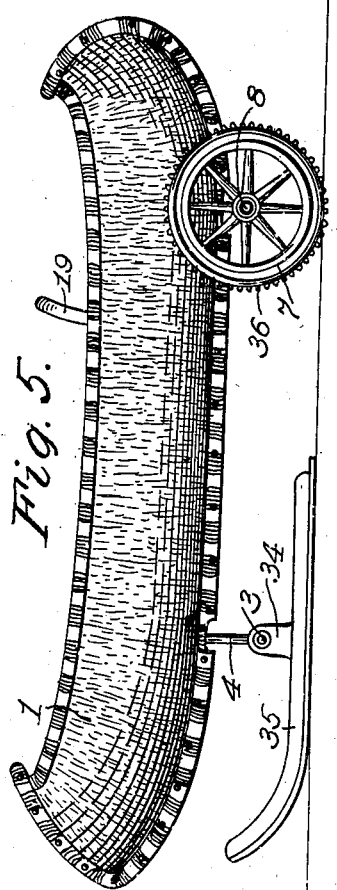
Inventor,
George Colvin Kennedy.

UNITED STATES PATENT OFFICE.

GEORGE COLVIN KENNEDY, OF WATERLOO, IOWA.

VEHICLE.

1,219,821.  Specification of Letters Patent.  Patented Mar. 20, 1917.

Application filed June 26, 1916. Serial No. 106,049.

*To all whom it may concern:*

Be it known that I, GEORGE COLVIN KENNEDY, a citizen of the United States of America, and a resident of Waterloo, Blackhawk county, Iowa, have invented certain new and useful Improvements in Vehicles, of which the following is a specification.

My invention relates to improvements in vehicles, and the object of my improvement is to supply a device of this class with a body suspensively and resiliently supported on a frame or chassis to permit it to yield reactively in various directions relative to its points of support, and having suitable propelling means mounted thereon.

This object I have accomplished by the means which are hereinafter described and claimed, and which are illustrated in the accompanying drawings, in which—

Figure 1 is a vertical longitudinal medial section of my improved vehicle.

Figs. 2 and 3 are transverse sections taken on the lines $a$—$b$ and $c$—$d$ respectively of said Fig. 1.

Fig. 4 is a side elevation of said vehicle as mounted on carrying-wheels, and Fig. 5 is another side elevation showing sled-runners substituted for the front swinging wheels.

Similar numerals of reference denote corresponding parts throughout the several views.

The frame of my improved vehicle is composed of a longitudinally arranged bar or tube 14 connected fixedly by a T-coupling 13 at one end to the rear tubular standard 12, the lower end of the latter being coupled at 11 to the rear axle 8, the axle being rotatable in the coupling-sleeve 11. Carrying-wheels 7 are secured fixedly on opposite ends of said axle. A forward tubular standard 4 is mounted in a T-coupling 5 on the forward end of the tube 14 to rock laterally in said coupling. The lower end of the standard 4 is fixed in a T-coupling 10 mounted on the forward axle 3, rotatable wheels 2 being mounted on the ends of the axle. Above the coupling 5, a sleeve is fixed on said standard having oppositely extending lateral stirrups or foot-pedals 6 for steering purposes, but a handwheel or other steering-means may be mounted on said standard if desired.

The body 1 is of a canoe shape, but of course, may be of any other desired configuration. It may be in like halves with meeting flanges 28 having registering rivet or bolt-holes 29 within which may be placed securing-means, such as rivets 33. Openings 30 and 31 in the bottom of said body are located to permit the passage therethrough of the standards 4 and 12 respectively.

On the upper ends of said standards are secured the eye-bars 20 and 24 respectively. Eye-bolts 23 and 27 are secured in said body at or near its bottom at opposite sides, and at front and rear thereof, respectively. Resilient connections, preferably the coiled tension springs 22 and links 21 in front and the like springs 26 and links 25 in the rear connect the eye-bolts 23 and 27 with the eye-bars 20 and 24 respectively. These resilient connections are directed obliquely downwardly and outwardly from the said eye-bars, being also oblique forwardly and rearwardly.

The sides of the body are connected rigidly near the top and to the rear of the middle by a strong cross-bar 18 of cylindrical form. A seat 19 has a pair of laterally-spaced depending lugs which are mounted pivotally on the cross-bar 18 to permit the seat to rock forward and back thereon, one of the lugs being longer to form an arm 17. A pitman 15 is connected by means of a universal-joint 16 to the lower end of the arm 17, the rear end of the pitman being pivoted to a crank 9 integral with the rear axle 8.

When the person seated on the seat 19 has rocked the seat to the position indicated by the full lines in Fig. 1, the pitman and crank are in proper positions to be moved to start the vehicle in either a forward or back direction, the crank being off a dead-center. The seat may be rocked rearwardly to move the vehicle forwardly, or many be rocked forwardly to move it rearwardly, as is indicated by the two sets of dotted lines in Fig. 1. Continued rocking of the seat will move the vehicle continuously along, the inertia of momentum thereof serving to prevent the crank-connection from stopping on a dead-center.

The steering-wheels 2 are of small enough diameter to permit them to be rocked laterally through any desirable angle by means of the use of the steering stirrups 6, operable by the feet, which leaves the arms of the user free for other purposes. As shown in Fig. 5, sled-runners 35 may be substituted for the front wheels 2, and the rear wheels incased in armor 36, to permit the vehicle to be moved over ice or snow.

Since the body 1 is hung on springs which are suspended obliquely relative to both the longitudinal and transverse planes thereof, the body will yield resiliently in any direction from its points of suspension under the shocks and jars of progression over the rough surfaces, or as moved by the movements of the rider, which causes the rider to ride without feeling disagreeable shocks, and with a rolling motion resembling that of a canoe in the water. The device is therefore peculiarly suitable for use by children or invalids, and since propulsion is effected by the muscles of the trunk instead of those of the limbs, the body of the rider is strengthened where it is ordinarily insufficiently exercised.

Having described my invention, what I claim as new, and desire to secure by Letters Patent, is—

1. In a vehicle, a hollow body, a frame inclosed therein, carrying-wheels for said body, said body having openings, supports connected between said wheels and said frame and passed through said opening, and yieldable resilient connections between said frame and said body adapted to allow the body to swing yieldingly in any direction from its points of support.

2. In a vehicle, a hollow body, a frame inclosed therein, forward and rear carrying-wheels, said body having openings, the forward wheels having connecting-means to said frame passed through one of said openings and adapted for rocking laterally, and the rear wheels mounted on an axle rotatable in a bearing-connection passed through another of said openings and connected rigidly to said frame, and yieldable resilient connections between said body and said frame.

3. In a vehicle, a hollow body having openings, a frame located within said body with extensions projecting through said openings, means for transportation mounted on said extensions without said body, and movable connections between said body and said frame located within said body.

4. In a vehicle, a hollow body, a frame located within the body, means for transportation connected to said frame including a steering device, driving-mechanism mounted on said body and operatively connected to said means for transportation, and movable supporting connections between said body and frame.

5. In a vehicle, a hollow body having orifices in its bottom, rear carrying-wheels mounted on an axle provided with a crank, forward carrying-wheels rotatable on an axle, a rock-shaft passed through one of said orifices into said body and having the forward axle fixed thereon to be rocked laterally therewith, an upright passed through another of said orifices into said body, having said rear axle rotatably mounted on its lower end, a longitudinal frame-bar within said body rigidly connected to the rear upright and pivotally connected to said rock-shaft, yieldable resilient connections between the upper ends of said rock-shaft and said rear upright and opposite parts of the forward and rear ends of the body respectively adapted to allow the body to swing yieldingly and suspensively in any direction, a seat mounted on said body to oscillate therein, and driving-connections between said seat and the crank on the rear axle.

6. In a vehicle, a frame, and a body inclosing said frame and yieldably resiliently supported thereon.

7. In a vehicle, a frame, a hollow body inclosing said frame and yieldably resiliently supported thereon, and means for propelling said vehicle in either direction.

8. In a vehicle, a frame, a body inclosing said frame, and yieldable resilient connections connected divergingly between said frame and said body.

9. In a vehicle, a frame, a body inclosing said frame, and yieldable resilient connections connected between said frame and said body within said body for suspending the body resiliently upon the frame.

10. In a vehicle, a hollow body, a frame inclosed within said body having longitudinally-spaced standards, and yieldable resilient connections between the upper ends of said standards and the lower parts of the body on each side thereof, the body being suspended in equilibrium thereby on the standards.

Signed at Waterloo, Iowa, this 20th day of April, 1916.

GEORGE COLVIN KENNEDY.

Witnesses:
PEARL MARIE STANTON,
C. C. LINDNER.